United States Patent
Yukiyama et al.

(10) Patent No.: US 9,851,947 B2
(45) Date of Patent: Dec. 26, 2017

(54) ARITHMETIC PROCESSING METHOD AND ARITHMETIC PROCESSOR HAVING IMPROVED FIXED-POINT ERROR

(71) Applicant: SANKEN ELECTRIC CO., LTD., Niiza-Shi, Saitama (JP)

(72) Inventors: Hiroki Yukiyama, Niiza (JP); Kazuhiro Mima, Niiza (JP); Takanaga Yamazaki, Tama (JP)

(73) Assignee: SANKEN ELECTRIC CO., LTD., Niiza-shi (JP)

( * ) Notice: Subject to any disclaimer, the term of this patent is extended or adjusted under 35 U.S.C. 154(b) by 169 days.

(21) Appl. No.: 14/746,929

(22) Filed: Jun. 23, 2015

(65) Prior Publication Data
US 2016/0085511 A1 Mar. 24, 2016

(30) Foreign Application Priority Data
Sep. 19, 2014 (JP) ................. 2014-191010

(51) Int. Cl.
*G06F 7/535* (2006.01)

(52) U.S. Cl.
CPC ...... *G06F 7/535* (2013.01); *G06F 2207/5355* (2013.01); *G06F 2207/5356* (2013.01)

(58) Field of Classification Search
CPC ...... G06F 7/535; G06F 2207/5354–2207/5356
USPC ...................................... 708/650, 653–654
See application file for complete search history.

(56) References Cited

U.S. PATENT DOCUMENTS

| | | | | |
|---|---|---|---|---|
| 5,928,318 A | * | 7/1999 | Araki ................ | G06F 7/535 708/650 |
| 7,007,058 B1 | * | 2/2006 | Kotlov .............. | G06F 1/0356 708/654 |
| 2004/0167956 A1 | * | 8/2004 | Vihriala ............. | G06F 1/03 708/654 |
| 2006/0179092 A1 | * | 8/2006 | Schmookler ........ | G06F 7/535 708/204 |
| 2006/0184594 A1 | * | 8/2006 | Lutz .................. | G06F 7/535 708/200 |
| 2008/0091754 A1 | * | 4/2008 | Hasebe .............. | G06F 7/535 708/209 |

(Continued)

FOREIGN PATENT DOCUMENTS

JP     H02-051732 A     2/1990

*Primary Examiner* — Matthew Sandifer
(74) *Attorney, Agent, or Firm* — Metrolexis Law Group, PLLC

(57) ABSTRACT

An arithmetic processing method is provided using a binary fixed-point arithmetic processing circuit to carry out an operation of multiplicatively dividing a dividend by a divisor. The method comprises shifting the divisor by a specific number of bits when the absolute value of the divisor is within a specific range, and holding the divisor without shifting the divisor when the absolute value of the divisor is out of the specific range, acquiring an initial value of approximation calculation for the divisor that is shifted or held without being shifted, calculating a reciprocal of the divisor by performing asymptotic approximation of the acquired initial value more than once, and calculating a product of the calculated reciprocal and the dividend, and shifting the calculated product by the specific number of bits when the divisor is shifted.

4 Claims, 7 Drawing Sheets

(56) References Cited

U.S. PATENT DOCUMENTS

2010/0281087 A1* 11/2010 Powell .................. G06F 7/5375
   708/209
2014/0195581 A1* 7/2014 Wilkins .................. G06F 7/535
   708/653

* cited by examiner

ARITHMETIC PROCESSING METHOD AND ARITHMETIC PROCESSOR HAVING IMPROVED FIXED-POINT ERROR

CROSS REFERENCE TO RELATED APPLICATIONS

This application claims priority based on 35 USC 119 from prior Japanese Patent Application No. 2014-191010 filed on Sep. 19, 2014, entitled "ARITHMETIC PROCESSING METHOD AND ARITHMETIC PROCESSOR", the entire contents of which are hereby incorporated by reference.

BACKGROUND

The disclosure relates to an arithmetic processing method and an arithmetic processor, and more particularly relates to an arithmetic processing method and an arithmetic processor of multiplicatively dividing a binary fixed-point number.

A multiplicative division method is one of division methods to obtain an approximation value of a quotient by iteratively solving asymptotic approximation equations to calculate the reciprocal of a dividend, and then multiplying the calculated reciprocal of the dividend by a divisor. Newton-Raphson method and Goldschmidt method are known as typical multiplicative division methods.

In order to converge the approximations with a small number of iterations, both of the above methods use a lookup table (hereinafter referred to as the "LUT") or the like to acquire a rough approximation value (initial value) of the reciprocal of the divisor. Then, by iteratively performing asymptotic approximation calculations on the acquired initial value, the reciprocal having desired accuracy can be obtained.

Japanese Patent Application Publication No. 02-51732 (Patent Document 1) discloses an example of a technique using such a conventional Newton-Raphson method for floating-point operations.

Here, in the calculation of a binary fixed-point number using the multiplicative division method as described in Patent Document 1, if a value inputted to a unit to generate the reciprocal of a divisor and a value of the reciprocal outputted from the unit are expressed by using the same number of bits, division accuracy is deteriorated particularly in a range where the divisor is large. This is because, when the reciprocal of a large input value is represented by using the range covering the same number of bits, only a small number of bits are outputted as significant bits. In practice, a fixed-point error is about $\pm(100/2^i-1)$ % where the number of significant bits is i. As described above, the accuracy is significantly deteriorated when the number of significant bits of the fixed-point number is small. As a result, the accuracy of the operation result is also significantly deteriorated unless the initial value of approximation has sufficient accuracy.

SUMMARY

An embodiment of an arithmetic processing method using a binary fixed-point arithmetic processing circuit to carry out an operation of multiplicatively dividing a dividend by a divisor comprises: shifting the divisor by a specific number of bits when the absolute value of the divisor is within a specific range, and holding the divisor without shifting the divisor when the absolute value of the divisor is out of the specific range; acquiring an initial value of approximation calculation for the divisor that is shifted or held without being shifted; calculating a reciprocal of the divisor by performing asymptotic approximation of the acquired initial value more than once; and calculating a product of the calculated reciprocal and the dividend, and shifting the calculated product by the specific number of bits when the divisor is shifted.

An embodiment of an arithmetic processor for multiplicative division of a binary fixed-point number, comprises: a pre-approximation shift circuit that shifts a divisor by a specific number of bits when the absolute value of the divisor is within a specific range, and hold the divisor without shifting the divisor when the absolute value of the divisor is out of the specific range; an initial value acquisition circuit that acquires an initial value of approximation calculation for the divisor that is shifted or held without being shifted; an asymptotic approximation circuit that calculates a reciprocal of the divisor by performing asymptotic approximation of the acquired initial value more than once; and a multiplication shift circuit that calculates a product of the calculated reciprocal and the dividend, and shift the calculated product by the specific number of bits when the divisor is shifted.

DETAILED DESCRIPTION

Configuration of Arithmetic Processor

Figure 1:
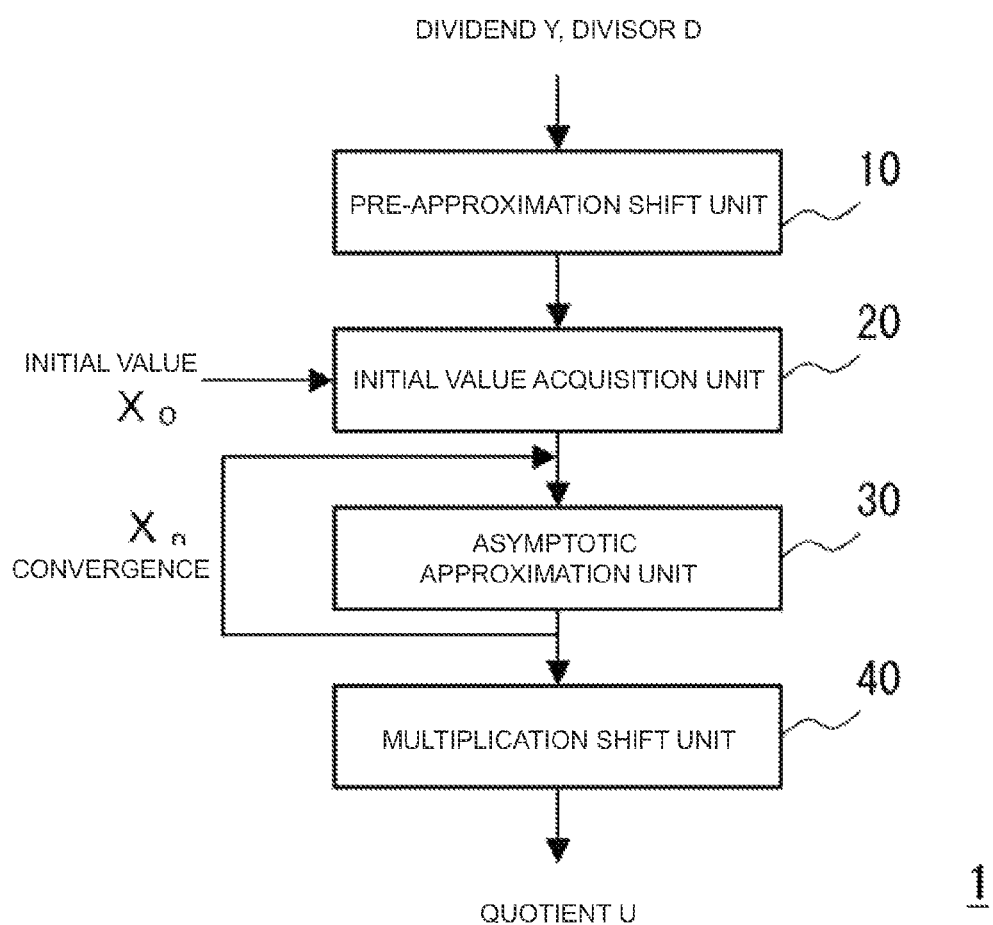
FIG. 1 is a block diagram illustrating a functional configuration of an arithmetic processor according to an embodiment.

With reference to FIG. 1, description is given of a configuration of arithmetic processor 1 according to an embodiment.

Arithmetic processor 1 according to the embodiment includes a divider circuit configured to multiplicatively divide a binary fixed-point number. Arithmetic processor 1 is a divider used in a DSP (Digital Signal Processor), an MPU (Micro Processing Unit), a GPU (Graphics Processing Unit) and the like, and may be a part of a SOC (System-on-a-chip).

As illustrated in FIG. 1, arithmetic processor 1 calculates quotient U=dividend Y (numerator)/divisor D (denominator). In this event, approximation value $X_n$ that is the reciprocal of divisor D is calculated by asymptotic approximation calculation, and then the product of approximated value $X_n$ and dividend Y is calculated to obtain quotient U. More specifically, arithmetic processor 1 performs a fast multiplicative division calculation of quotient U=dividend y×$X_n$.

Also, arithmetic processor 1 makes an appropriate shift (bit shift) for divisor D, $X_n$ and the like, as described below, when performing the calculation described above. Thus, accurate multiplicative division of a binary fixed-point number can be performed.

To be more specific, arithmetic processor 1 includes pre-approximation shift unit 10 (pre-approximation shift unit), initial value acquisition unit 20 (initial value acquisition unit), asymptotic approximation unit 30 (asymptotic approximation unit) and multiplication shift unit 40 (multiplication shift unit).

Pre-approximation shift unit 10 shifts the divisor D by a specific number of bits when the absolute value of the divisor is within a specific range, and holds the divisor without shifting the divisor when the absolute value of the divisor is out of the specific range. To be more specific, pre-approximation shift unit 10 determines whether or not the value of divisor D is within a specific range set by a specific value, before calculating approximation value $X_n$ that is the reciprocal of divisor D, and the like. When divisor D is within the specific range, pre-approximation shift unit 10 shifts divisor D to the right by a specific number of bits corresponding to the specific range. The right shift increases the value of divisor D by $\frac{1}{2}^{(specific\ number\ of\ bits)}$, and the shifted lower bit becomes underflow and is thus dropped. Note that, in this embodiment, the right shift is made while keeping the sign of the most significant bit unchanged.

Pre-approximation shift unit 10 also checks the number of significant bits of divisor D, and calculates the specific range and the specific number of bits so as to obtain the number of significant bits of the reciprocal $X_n$ of divisor D corresponding to the number of significant bits. More specifically, pre-approximation shift unit 10 calculates a pair of the specific range and the specific number of bits so as to suppress accuracy deterioration, which is caused by loss of information on divisor D by the shift, below a specific error, and to ensure the accuracy of the approximation value of the reciprocal of the divisor. Such a specific error regarding the accuracy deterioration is determined based on, for example, the number of digits of a multiplier (binary multiplier, hereinafter referred to as the "MUL") and the number of bits of dividend Y or divisor D inputted, so that appropriate operational precision is achieved corresponding to the intended use of arithmetic processor 1. Therefore, it is preferable to prepare several pairs of the specific range and the specific number of bits.

As described above, making a shift corresponding to the magnitude of divisor D enables division while avoiding a range with deteriorated accuracy of the reciprocal of divisor D.

Initial value acquisition unit 20 acquires an initial value $X_0$ of approximation calculation for asymptotic approximation calculation of divisor D shifted by pre-approximation shift unit 10 or divisor D held without being shifted. In this embodiment, $X_0$ is a rough approximation value of the reciprocal of divisor D, which is acquired from reciprocal approximation value generation LUT 140 (FIG. 2) to be described later.

Asymptotic approximation unit 30 calculates the reciprocal of divisor D by performing, more than once, asymptotic approximation of the initial value acquired by initial value acquisition unit 20. In this embodiment, asymptotic approximation unit 30 performs calculation of asymptotic approximation equation $X_n = X_{n-1}(2 - divisor\ D \times X_{n-1})$ according to Newton-Raphson method. This approximation calculation converges $X_n$.

Multiplication shift unit 40 calculates the product of dividend Y and the reciprocal $X_n$ calculated by asymptotic approximation unit 30, and then shifts the calculated product by the specific number of bits when divisor D is shifted. In this embodiment, multiplication shift unit 40 also shifts the calculation result (product) of dividend $Y \times X_n$ to the right by the same specific number of bits, when divisor D is within the specific range and the right shift is made before $X_n$ that is the reciprocal is calculated, and then completes the division. This is because the product obtained from divisor D shifted to the right by the specific number m of bits is $2^m$ times greater than quotient U to be obtained. Thus, multiplication shift unit 40 shifts again the value of the product to the right by the specific number m of bits to multiply the product by $\frac{1}{2}^m$, thereby calculating an actual quotient U.

Alternatively, when divisor D is out of the specific range and no shift is made, multiplication shift unit 40 completes the division after setting the calculation result of dividend $Y \times X_n$ as quotient U.

Figure 2:
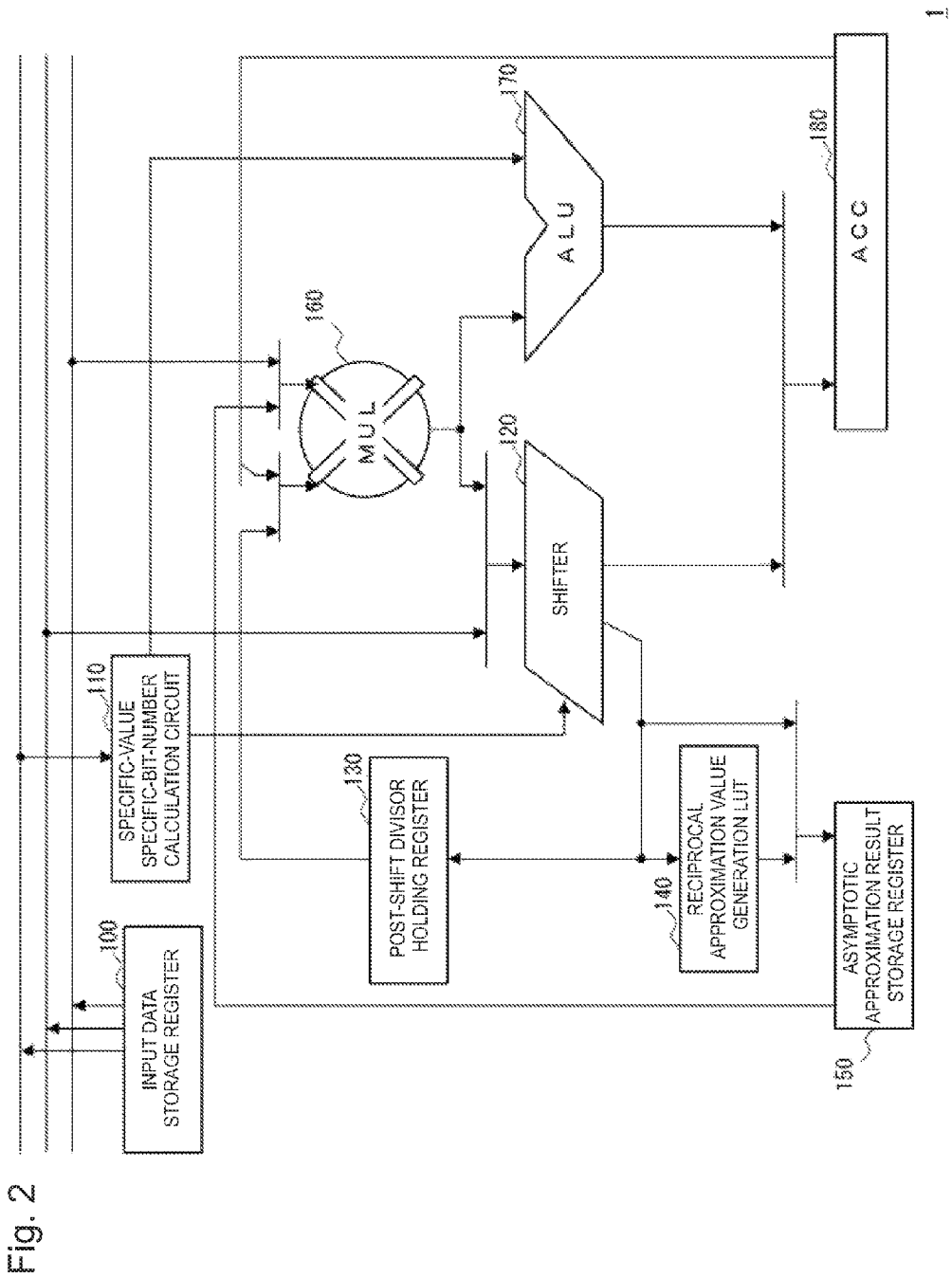
FIG. 2 is a block diagram illustrating a schematic configuration of a circuit in the arithmetic processor according to the embodiment.

Next, with reference to FIG. 2, description is given of a schematic configuration of a circuit (arithmetic processing circuit) in arithmetic processor 1.

Arithmetic processor 1 mainly includes input data storage register 100, specific-value specific-bit-number calculation circuit 110, shifter 120, post-shift divisor holding register 130, reciprocal approximation value generation LUT 140, asymptotic approximation result storage register 150, MUL 160, ALU 170 (Arithmetic Logic Unit) and ACC 180 (Accumulator).

Input data storage register 100 is a register or the like that is a temporary storage medium to store a specific value. Input data storage register 100 may be a general-purpose register, such as DSP, including sixteen 16-bit registers, for example. Input data storage register 100 stores dividend Y and divisor D.

Specific-value specific-bit-number calculation circuit 110 is a circuit configured to calculate a specific value and a specific number of bits. Specific-value specific-bit-number calculation circuit 110 checks the number of significant bits of divisor D stored in input data storage register 100, and calculates the specific value from the number of significant bits. Specific-value specific-bit-number calculation circuit 110 calculates a specific range from the specific value, determines whether or not divisor D is within the specific range, and calculates the specific number of bits that specifies the number of shifts. Note that specific-value specific-bit-number calculation circuit 110 may have the relationship between the specific value and the specific number of bits as a table or the like in a ROM (Read Only Memory) or the like with a gate wired beforehand. In other words, the specific value and the specific range may be fixed values held in the ROM or the like.

Moreover, specific-value specific-bit-number calculation circuit 110 outputs a value obtained by shifting a constant in a recurrence equation to the left, to ALU 170. The number of bits to be shifted to the left is the number of bits of the fractional portion increased by the product calculated by MUL 160 in multiplication during an asymptotic approximation step to be described later. In the example of this embodiment, as described later, the number of bits with the increased fractional portion is 15 bits. Thus, in this embodiment, specific-value specific-bit-number calculation circuit 110 outputs a value ("0x10000" in hexadecimal notation) obtained by shifting a constant "2" to the left by 15 bits, to ALU 170. Note that such a value obtained by shifting the constant in the recurrence equation to the left may also be held beforehand in the ROM or the like in specific-value specific-bit-number calculation circuit 110. In other words, the value obtained by shifting the constant in the recurrence equation to the left may also be a fixed value held in the ROM or the like.

Shifter 120 is a circuit configured to make a right or left bit shift (shift) so as to correspond to a signal specifying the number of shifts inputted for the inputted value. Shifter 120 shifts divisor D, the product of dividend Y×$X_n$, and the like to the right by the specific number of bits calculated by specific-value specific-bit-number calculation circuit 110, and then rounds off the fractional portion. Moreover, shifter 120 shifts $X_n$ during the asymptotic approximation to the right, so as to obtain the number of bits that can be stored in post-shift divisor holding register 130. Note that shifter 120 may perform sign extension of the inputted value before and after the shift.

Post-shift divisor holding register 130 is a register or the like configured to store divisor D shifted by shifter 120. As post-shift divisor holding register 130, a register may be used, which is for the number of bits obtained by adding one sign bit to the number of bits in input data storage register 100.

Reciprocal approximation value generation LUT 140 is a LUT configured to output a value corresponding to the inputted value, by referring to the table held in the ROM or the like. Upon receipt of divisor D shifted by shifter 120, reciprocal approximation value generation LUT 140 outputs a rough approximation value of the reciprocal of divisor D. The approximation value turns into the initial value $X_0$ of approximation calculation, as described above. Note that reciprocal approximation value generation LUT 140 need not hold all approximation values corresponding to the values inputted, but may hold a table corresponding to a value rounded by a specific bit or value range or may output a value subjected to linear interpolation or the like.

Asymptotic approximation result storage register 150 is a register configured to store the initial value $X_0$ outputted by reciprocal approximation value generation LUT 140, $X_n$ during the asymptotic approximation, and the like.

MUL 160 is a multiplication circuit configured to perform multiplication of two values inputted. As MUL 160, a circuit of a scale corresponding to required accuracy and the like in conformity to the intended use of arithmetic processor 1 can be used. In this embodiment, MUL 160 performs multiplication during asymptotic approximation, multiplication of dividend Y and the calculated $X_n$, and the like.

ALU 170 is a circuit configured to perform logical operations, addition and subtraction. ALU 170 realizes a product-sum operation together with MUL 160. In this embodiment, ALU 170 carries out operations of subtraction and the like in the recurrence equation for asymptotic approximation. ALU 170 is configured to be able to input a value having the same number of bits as that of the result of multiplication by MUL 160.

ACC 180 is a register or the like configured to accumulate operation results. In this embodiment, ACC 180 stores values in the middle of approximation calculation, quotient U of the division performed, and the like. ACC 180 may store the value of the number of bits that can store the results of operations by ALU 170.

Division Processing

Next, with reference to FIGS. 3 to 7, description is given of processes in division processing according to the arithmetic processing method for the division by arithmetic processor 1 of this embodiment.

In the division processing according to this embodiment, description is given of an example where Newton-Raphson method is used as a division method, fixed-point dividend Y and divisor D in a format of 1 sign bit+15 bits (16 bits) for upper to lower bits are used as inputs, and output 32-bit signed division is performed.

In the division processing according to this embodiment, when the absolute value of the divisor is large, the divisor is shifted to the right before calculation of the reciprocal, thereby avoiding accuracy deterioration of the reciprocal. Therefore, before asymptotic approximation, a specific value and a specific number of bits are calculated, and divisor D is shifted to the right by the specific number of bits (Step S101). Next, an initial value $X_n$ is acquired for asymptotic approximation of the reciprocal of divisor D shifted to the right (Step S102). Then, according to the asymptotic approximation equation $X_n = X_{n-1}(2 - DX_{n-1})$, $X_n$ is converged and approximated (Steps S103 and S104). Finally, approximation result $X_3$ of the reciprocal of divisor D is multiplied by dividend Y (Step S105). In this event, the value calculated from divisor D shifted to the right by the specific number m of bits is $2^n$ times greater than a value to be obtained. Thus, such a value is shifted again to the right by the specific number m of bits to obtain quotient U.

Note that, in the case of fixed-point operation, addition or subtraction does not change the number of bits in the fractional portion, and multiplication or division shifts only the position of decimal point of the multiplier. Therefore, in the following description, the number of bits in the fixed-point fractional portion of each value is represented by Q notation (Q format) such as "Q( )". Here, in this embodiment, the number of bits in the fractional portion of dividend Y is y, and Q(y) in Q notation. Moreover, in the following description, it is assumed that the left side of each bit is the upper bit and the right side thereof is the lower bit.

Figure 3:
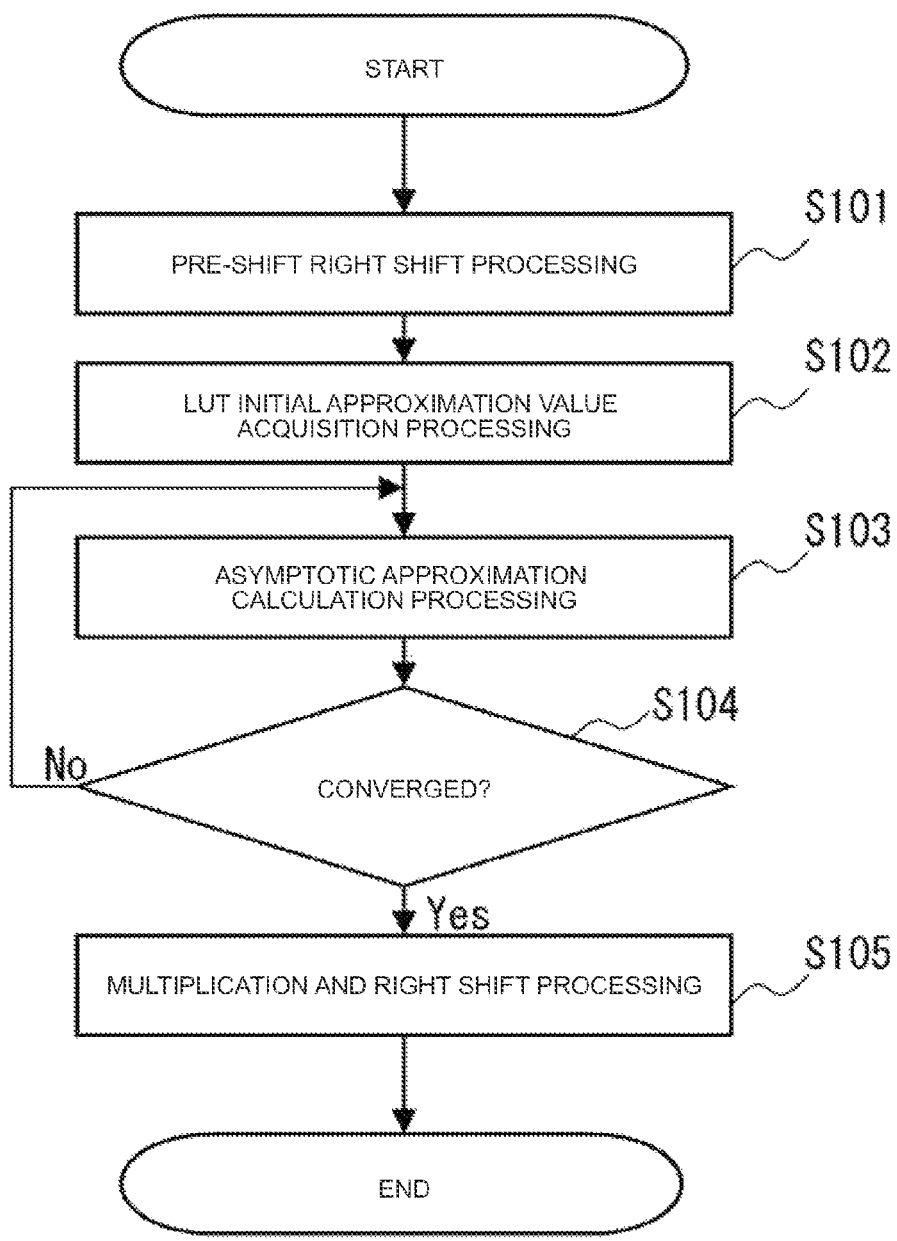
FIG. 3 is a flowchart illustrating division processing according to the embodiment.

The division processing according to this embodiment is described in detail below for each step with reference to a flowchart illustrated in FIG. 3.

(Step S101)

First, pre-approximation shift unit 10 including input data storage register 100, specific-value specific-bit-number calculation circuit 110 and shifter 120 performs pre-approximation right shift processing.

Figure 4:
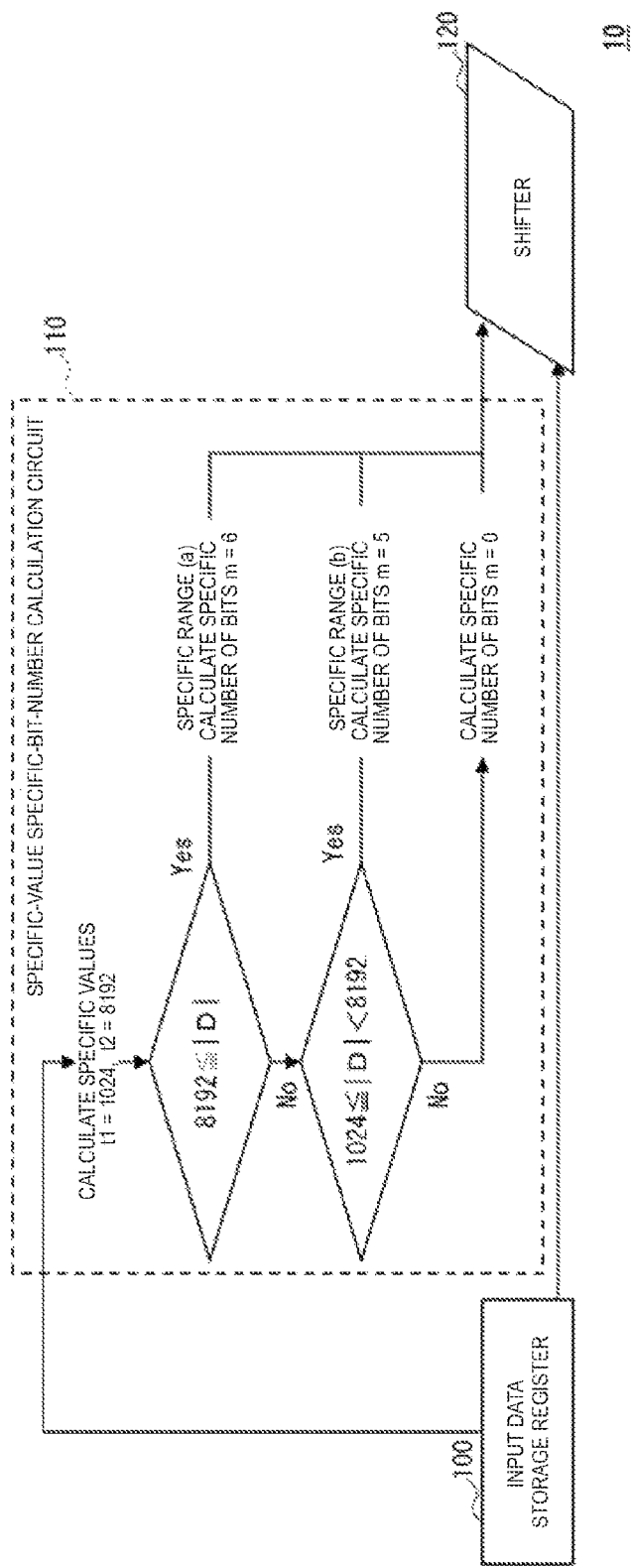
FIG. 4 is a diagram illustrating pre-approximation right shift processing illustrated in FIG. 3.

Specific description is given with reference to FIG. 4. Specific-value specific-bit-number calculation circuit 110 receives divisor D from input data storage register 100. Then, specific-value specific-bit-number calculation circuit 110 calculates a specific value corresponding to the number of bits of divisor D. Specific-value specific-bit-number calculation circuit 110 also calculates the number of significant bits of divisor D. In this event, specific-value specific-bit-number calculation circuit 110 calculates the maximum bit of the absolute value of divisor D as the significant bit. Then, when the absolute value of divisor D is within a range (specific range) between the calculated specific values, according to the significant bit, specific-value specific-bit-number calculation circuit 110 calculates the specific number of bits. In this embodiment, the specific number of bits serves as the number of right shifts to be made when the absolute value of divisor D is large.

A specific example is described. Specific-value specific-bit-number calculation circuit 110 calculates a specific value t1=1024 corresponding to the number of significant bits=11 and a specific value t2=8192 corresponding to the number of significant bits=14, for the number of bits=16 of divisor D. In addition, specific-value specific-bit-number calculation circuit 110 calculates the number of significant bits of divisor D and compares with a specific range specified by the specific values t1 and t2. In the case of this example, specific-value specific-bit-number calculation circuit 110 calculates the specific number m of bits as "6" so as to shift divisor D to the right by 6 bits, when specific range (a) 8192≤|divisor D| is satisfied. Also, specific-value specific-bit-number calculation circuit 110 calculates the specific number m of bits as "5" so as to shift divisor D to the right by 5 bits, when specific range (b) 1024≤|divisor D|<8192 is satisfied. Moreover, when 1024>|divisor D|, specific-value specific-bit-number calculation circuit 110 holds divisor D without making any shift since the absolute value of divisor D is out of the specific range. In this case, specific-value specific-bit-number calculation circuit 110 may calculate the specific number m of bits as "0". Then, specific-value specific-bit-number calculation circuit 110 outputs a signal specifying the number of shifts corresponding to the specific number of bits, to shifter 120.

Meanwhile, shifter 120 receives divisor D from input data storage register 100, and first performs sign extension for 20 bits. In other words, divisor D inputted to shifter 120 ends up having 36 bits in total. Then, shifter 120 shifts divisor D to the right by the specific number of bits, in response to the signal specifying the number of shifts, or holds divisor D without making any shift. Shifter 120 outputs 16 bits among the lower bits in divisor D shifted to the right or held (hereinafter referred to as "divisor D'") to reciprocal approximation value generation LUT 140 and post-shift divisor holding register 130.

(Step S102)

Next, initial value acquisition unit 20 including post-shift divisor holding register 130, reciprocal approximation value generation LUT 140 and asymptotic approximation result storage register 150 performs LUT initial approximation value acquisition processing.

Figure 5:
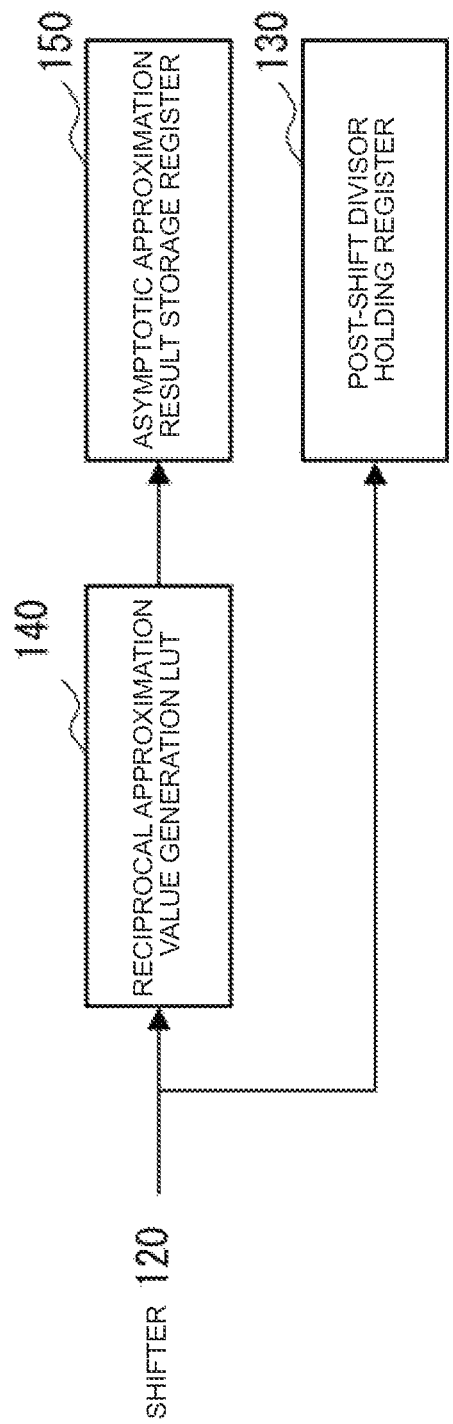
FIG. 5 is a diagram illustrating LUT initial approximation acquisition processing illustrated in FIG. 3.

Specific description is given with reference to FIG. 5. Reciprocal approximation value generation LUT 140 acquires divisor D' from shifter 120, acquires $X_0$ that is an initial value of approximation calculation of the reciprocal of divisor D corresponding to divisor D', and outputs $X_0$ to asymptotic approximation result storage register 150. In this embodiment, the number of bits in asymptotic approximation result storage register 150 is 16. Also, $X_0$ is $X_0$ (Q(15−d+m)) in Q notation.

Meanwhile, post-shift divisor holding register 130 acquires and stores divisor D'. As described above, in this embodiment, post-shift divisor holding register 130 holds the divisor after adding 1 sign bit to the number of bits of divisor D. Thus, in this embodiment, the number of bits of divisor D' thus stored is (1 sign bit+16 bits), i.e., 17 bits. Also, divisor D' is D'(Q(d−m)) in Q notation.

(Step S103)

Next, asymptotic approximation unit 30 including shifter 120, post-shift divisor holding register 130, asymptotic approximation result storage register 150, MUL 160, ALU 170 and ACC 180 performs asymptotic approximation calculation processing.

Specific description is given with reference to FIG. 6. Asymptotic approximation unit 30 calculates approximation equation $X_n = X_{n-1}(2-D'X_{n-1})$ according to Newton-Raphson method.

Since such calculation of the equation requires two multiplication operations, two cycles are required.

Figure 6A:
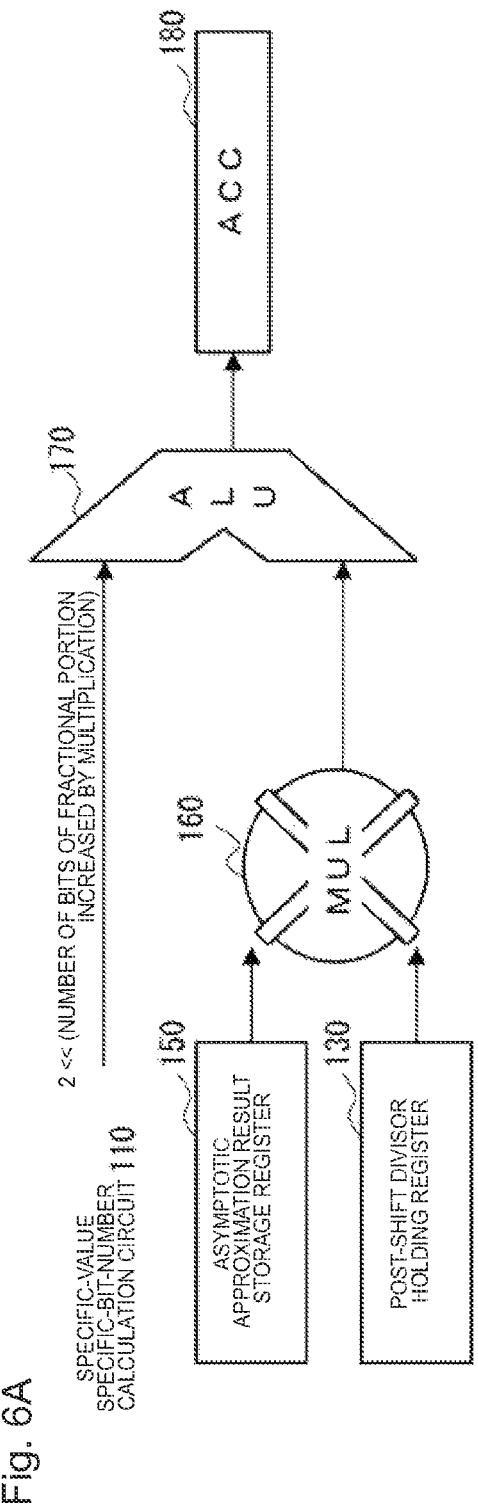
FIGS. 6A and 6B are diagrams illustrating asymptotic approximation calculation processing illustrated in FIG. 3.

First, as illustrated in FIG. 6A, in the first cycle, asymptotic approximation unit 30 carries out a product-sum operation to calculate $2-D'X_{n-1}$, and stores the result in ACC 180. To be more specific, MUL 160 acquires the value of divisor D' stored in post-shift divisor holding register 130 and the value of $X_{n-1}$ (initial value is $X_0$) stored in asymptotic approximation result storage register 150, and multiplies the acquired values. In this embodiment, when MUL 160 performs multiplication of 17 bits×16 bits, i.e., 36 bits, the result of the multiplication is Q((15−d+m)+(d−m)) in Q notation, resulting in $D'X_{n-1}$ (Q15). More specifically, the number of bits in the fractional portion increased by the product of the multiplication by MUL 160 in the first cycle is 15. Thus, ALU 170 subtracts the product of the multiplication from the value obtained by shifting 2 to the left by 15 bits, and the result of the subtraction in ACC 180. The value stored in ACC 180 is $2-D'X_{n-1}$ (Q(15)) in Q notation.

Figure 6B:
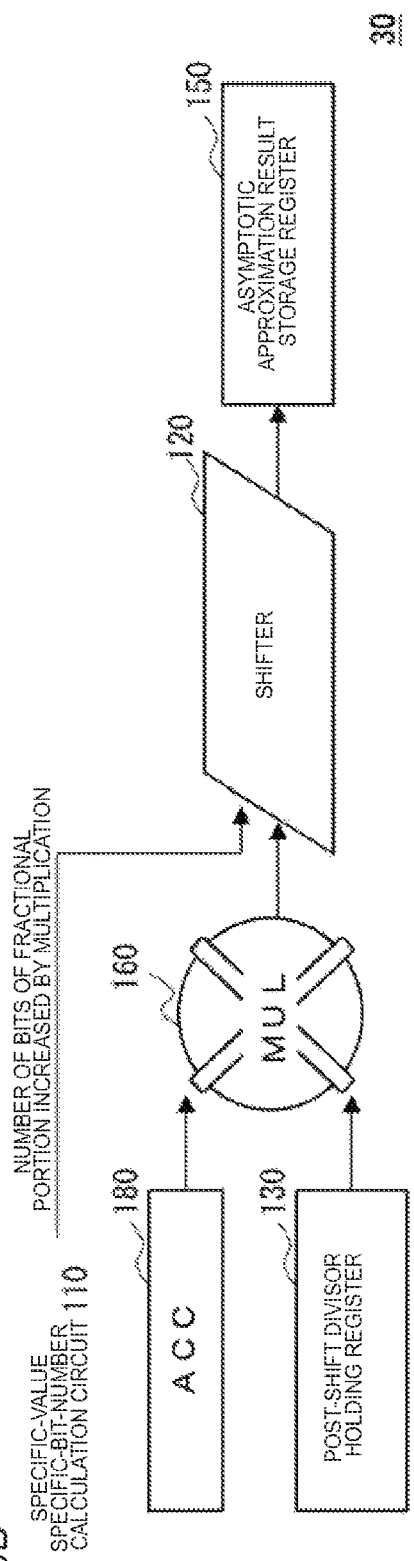

As illustrated in FIG. 6B, in the second cycle, the product of $2-DX_{n-1}$ that is the result of the operation in the first cycle and $X_{n-1}$ is first calculated. Then, the product is shifted to the right and stored in asymptotic approximation result storage register 150. To be more specific, MUL 160 acquires the value of $2-DX_{n-1}$ stored in ACC 180 and the value of $X_{n-1}$ stored in asymptotic approximation result storage register 150, and multiplies the values. When MUL 160 performs the multiplication of 17 bits×16 bits as described above, the product is $X_{n-1}(2-DX_{n-1})$ (Q(30−d+m)) in Q notation. Shifter 120 shifts the value of the product to the right for 15 bits. Shifter 120 stores the product shifted to the right, as $X_n$, in asymptotic approximation result storage register 150. $X_n$ stored is Q(15−d+m) in Q notation.

(Step S104)

Next, asymptotic approximation unit 30 determines whether or not $X_n$ is converged by the approximation calculation.

As described above, in the example of this embodiment, it is determined that $X_n$ is converged after performing three approximation calculations. Thus, asymptotic approximation unit 30 determines Yes when the asymptotic approximation calculation is completed up to $X_3$, and handles $X_3$ obtained as the result of the asymptotic approximation. On the other hand, asymptotic approximation unit 30 determines No when $X_3$ is not calculated yet.

In the case of Yes, asymptotic approximation unit 30 advances the processing to Step S105.

In the case of No, asymptotic approximation unit 30 returns the processing to Step S103 to continue the approximation calculation. Thus, Steps S103 to S104 are executed three times.

(Step S105)

When $X_3$ is calculated, multiplication shift unit 40 including input data storage register 100, shifter 120, post-shift divisor holding register 130, MUL 160 and ACC 180 performs multiplication and right shift processing.

Multiplication shift unit 40 multiplies the result of the approximation of the reciprocal of divisor D by dividend Y, and shifts the product to the right to calculate a final quotient U.

Figure 7:
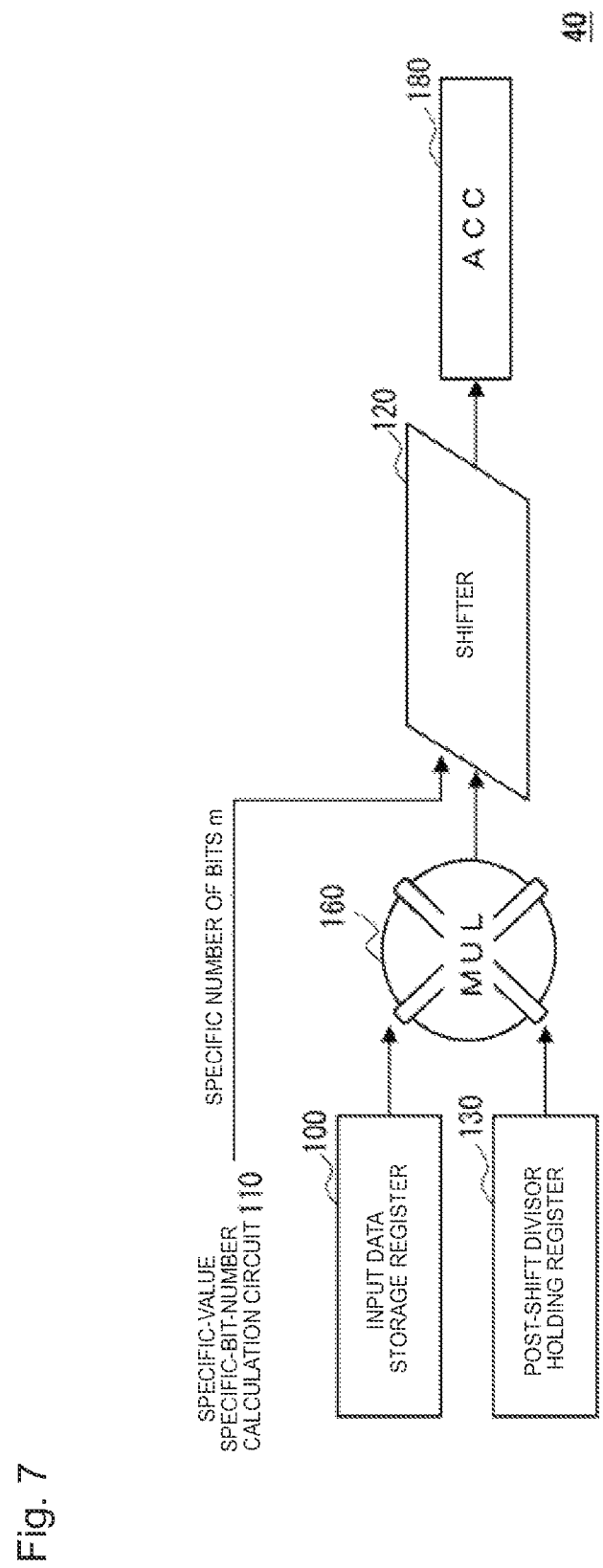
FIG. 7 is a diagram illustrating multiplication and right shift processing illustrated in FIG. 3.

Specific description is given with reference to FIG. 7. MUL 160 acquires $X_3$ that is the asymptotic approximation result obtained through the above processing, from asymptotic approximation result storage register 150, acquires dividend Y from input data storage register 100, and multiplies the both. In this embodiment, in this event, MUL 160 multiplies 17 bits obtained by adding 1 sign bit to dividend Y by $X_3$ that is 16 bits. Thus, when dividend Y is Y(Q(y)) in Q notation, the product that is the result of the multiplication is $X_3Y(Q(15+y-d+m))$ in Q notation.

Shifter 120 receives the product, acquires a signal corresponding to the specific number m of bits from specific-value specific-bit-number calculation circuit 110, and makes a right shift. More specifically, shifter 120 makes a right shift by the same number of bits as that in Step S101 for dividend Y. Shifter 120 stores the result after the shift, as quotient U that is the result of a division command, in ACC 180. This quotient U is Q(15+y−d) in Q notation.

In this embodiment, the processing described above enables the division to be performed with an error of about ±2%. Also, in the example of this embodiment, the asymptotic approximation is performed three times. Therefore, assuming that 1 clock is required for Steps S101 to S102, 2 clocks for Steps S103 to S104 and 1 clock for Step S105, the division command can be completed in 8 clocks.

Thus, the division processing according to this embodiment is completed.

The above configuration can achieve the following effects.

In a conventional binary fixed-point multiplicative divider, the use of a multiplier with a small circuit scale (small number of digits) lowers the accuracy of the output result. This is because, when the absolute value of a divisor is large, the absolute value of the reciprocal thereof is reduced, inevitably resulting in the reduced number of significant digits of the reciprocal.

On the other hand, arithmetic processor 1 according to the embodiment is a divider configured to multiplicatively divide dividend Y that is a binary fixed-point number by divisor D. Arithmetic processor 1 includes: pre-approximation shift unit 10 configured to shift divisor D by a specific number of bits when the absolute value of divisor D is within a specific range, and hold divisor D without shifting the divisor when the absolute value of the divisor is out of the specific range; initial value acquisition unit 20 configured to acquire an initial value of approximation calculation for the divisor that is shifted or held without being shifted by pre-approximation shift unit 10; asymptotic approximation unit 30 configured to calculate the reciprocal of the divisor by performing, more than once, asymptotic approximation of the initial value acquired by initial value acquisition unit 20; and multiplication shift unit 40 configured to calculate the product of the reciprocal calculated by asymptotic approximation unit 30 and the dividend, and shift the calculated product by the specific number of bits when the divisor is shifted.

Such a configuration enables division that suppresses accuracy deterioration without increasing the number of digits of MUL 160 while avoiding asymptotic approximation in a range where divisor D is large.

More specifically, focusing on the fact that the relationship between divisor D and the reciprocal thereof is non-linear, there is not much influence on the value of the reciprocal X even if the lower bits are ignored to some extent particularly in the range where divisor D is large. Such a shift corresponding to the magnitude of divisor D makes it possible to perform division while avoiding a range where the accuracy of the reciprocal of the divisor is deteriorated, and to increase the accuracy while reducing errors in the division result.

Moreover, there has heretofore been a method to ensure the accuracy during fixed-point operations by extending the number of bits of a value involved in asymptotic approximation of division. In such a case of extending the number of bits of the value involved in the operation to ensure the accuracy, input and output of an arithmetic unit used for asymptotic approximation calculation, particularly, a multiplier need to be extended. For example, when signed division is performed using input 16 bits and output 32 bits, asymptotic approximation needs to be performed three times, for example, using Newton-Raphson method. In this event, extension of 5 bits or more needs to be performed to realize division with an error of 2% or less. Therefore, in the conventional technology, the multiplier is extended to have the number of digits, i.e., input 21 bits and output 42 bits.

However, the multiplier is a circuit with a large logical scale, and the number of elements therein is proportional to the square of the number of input bits. A multiplier with 21 input bits is, at the minimum, about 1.7 times as large as a multiplier with 16 input bits, leading to cost increase.

On the other hand, in the arithmetic processing method according to this embodiment, the division can be performed with ±2% error even with the use of MUL 160 of normal 17 bits×16 bits. Thus, it is no longer required to use a multiplier with a large number of digits, making it possible to reduce a circuit area and thus reduce costs.

Moreover, in arithmetic processor 1 according to the embodiment, pre-approximation shift unit 10 checks the number of significant bits of divisor D, and calculates a specific range and a specific number of bits so as to obtain the number of significant bits of the reciprocal $X_n$ of the divisor corresponding to the number of significant bits of the divisor. More specifically, pre-approximation shift unit 10 calculates the specific range and the specific number of bits so as to suppress accuracy deterioration, which is caused by loss of information on divisor D by the shift, below a specific error, and to ensure the accuracy of the approximation value of the reciprocal of divisor D.

Such a configuration can easily obtain the specific number of bits of the shift that optimizes the accuracy of quotient U to be calculated, just by checking the number of significant bits of divisor D. Moreover, since the calculation is easily performed, a specific bit can be calculated within one clock, for example, while suppressing the circuit scale.

Moreover, in arithmetic processor 1 according to the embodiment, asymptotic approximation unit 30 executes asymptotic approximation using Newton-Raphson method.

Such a configuration enables fast binary fixed-point multiplicative division with ensured accuracy. Moreover, the reciprocal of divisor D can be reliably converged in a state where the accuracy is ensured.

Note that, in the above embodiment, the description is given of the example where the asymptotic approximation is performed using Newton-Raphson method. However, the invention is not limited thereto but is also applicable to Goldschmidt method and the like. In such a case, different LUTs may be prepared, between Newton-Raphson method and Goldschmidt method, to acquire the initial value of approximation calculation.

Moreover, in the embodiment, comparison is made to the specific range of the specific value corresponding to the number of significant bits of the absolute value of the reciprocal D. However, a specific range may be set, that does not depend on the number of significant bits of the reciprocal D. For example, a table corresponding to the upper bit of the absolute value of the reciprocal D and the specific number of bits may be held in specific-value specific-bit-number calculation circuit 110 to calculate a specific bit. Furthermore, reciprocal approximation value generation LUT 140 may be configured to use different LUTs depending on the calculated specific number of bits.

As described above, according to the above embodiment, an arithmetic processor can be provided, which can obtain a highly accurate division result even with the use of a multiplier having a small number of digits, in fixed-point multiplicative division, by shifting a divisor by a specific number of bits when the absolute value of the divisor is within a specific range, holding the divisor without shifting the divisor when the absolute value thereof is out of the specific range, and shifting the calculated product by the specific number of bits when the reciprocal of the divisor is shifted.

Note that the configuration and operations described in the above embodiment are just an example, and needless to say, appropriate changes can be made without departing from the scope of the invention.

The arithmetic processing method described above is industrially applicable since the method is applicable to a circuit for division using a DSP, a CPU, a GPU or the like.

The invention claimed is:

1. An arithmetic processing method using a binary fixed-point arithmetic processing circuit to carry out an operation of multiplicatively dividing a dividend by a divisor, comprising:

shifting, by a shift circuit of the arithmetic processing circuit, the divisor by a specific number of bits when the absolute value of the divisor is within a specific range, and holding the divisor without shifting the divisor when the absolute value of the divisor is out of the specific range;

acquiring, by an acquisition circuit of the arithmetic processing circuit, an initial value of approximation calculation for the divisor that is shifted or held without being shifted;

calculating, by an approximation circuit of the arithmetic processing circuit, a reciprocal of the divisor by performing asymptotic approximation of the acquired initial value more than once;

calculating, by a multiplication shift circuit of the arithmetic processing circuit, a product of the calculated reciprocal and the dividend, and shifting the calculated product by the specific number of bits when the divisor is shifted;

calculating, by a calculation circuit of the arithmetic processing circuit, the specific range based on the number of significant bits of the reciprocal of the divisor corresponding to the number of significant bits of the divisor; and calculating, by the calculation circuit of the arithmetic processing circuit, the specific number of bits based on the number of significant bits of the reciprocal of the divisor corresponding to the number of significant bits of the divisor.

2. The arithmetic processing method of claim 1, wherein the asymptotic approximation is performed, by the approximation circuit of the arithmetic processing circuit, using Newton-Raphson method.

3. An arithmetic processor for multiplicative division of a binary fixed-point number, comprising:

a pre-approximation shift circuit that shifts a divisor by a specific number of bits when the absolute value of the divisor is within a specific range, and hold the divisor without shifting the divisor when the absolute value of the divisor is out of the specific range;

an initial value acquisition circuit that acquires an initial value of approximation calculation for the divisor that is shifted or held without being shifted;

an asymptotic approximation circuit that calculates a reciprocal of the divisor by performing asymptotic approximation of the acquired initial value more than once;

a multiplication shift circuit that calculates a product of the calculated reciprocal and the dividend, and shift the calculated product by the specific number of bits when the divisor is shifted; and a specific-value specific-bit-number calculation circuit that calculates the specific range and the specific number of bits are calculated based on number of significant bits of the reciprocal of the divisor corresponding to the number of significant bits of the divisor.

4. The arithmetic processor of claim 3, wherein the asymptotic approximation is performed using Newton-Raphson method.

* * * * *